May 1, 1962
E. A. LARSON
3,031,764
RANGE FINDER FOR GOLFERS
Filed Nov. 17, 1958
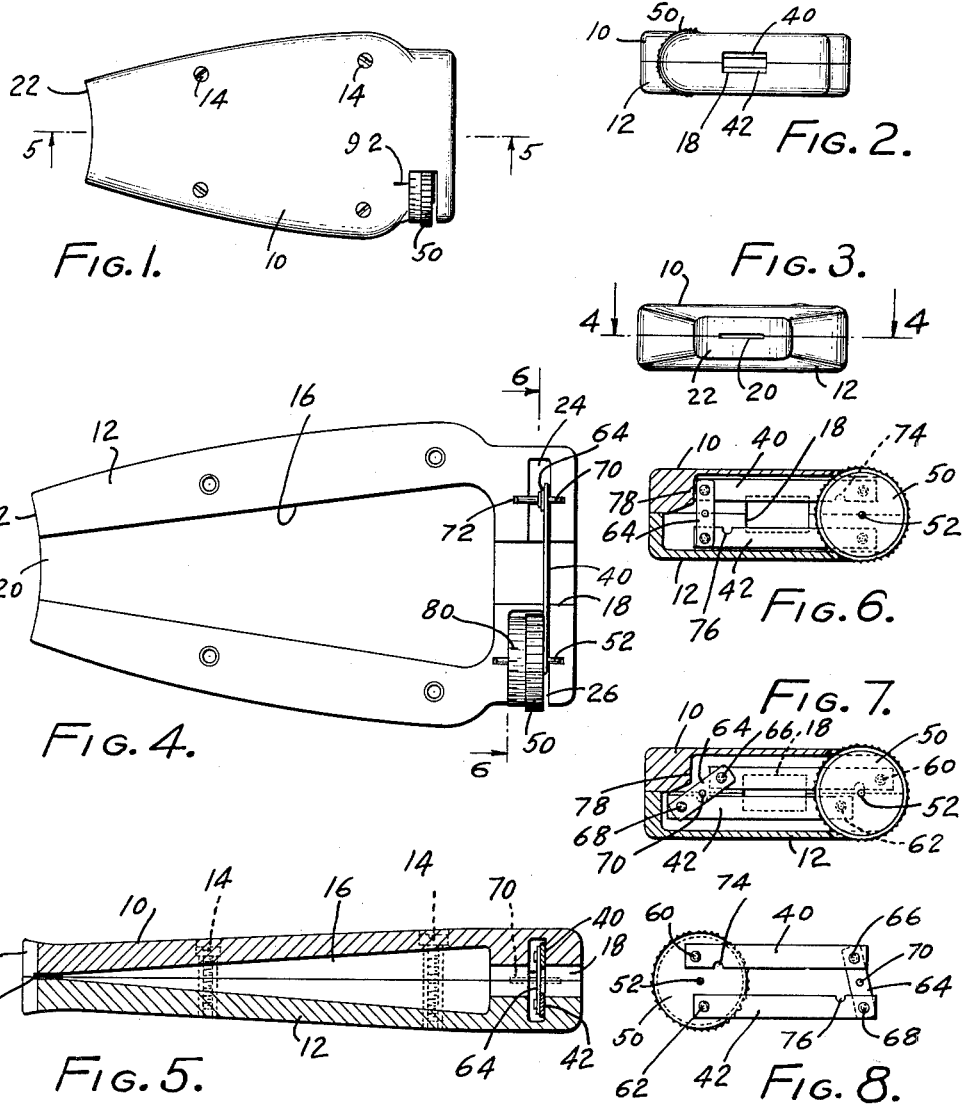
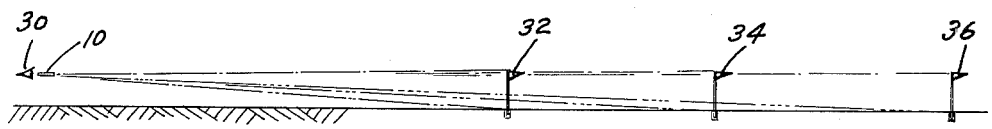
INVENTOR.
EDWARD A. LARSON
BY
ATTORNEY

United States Patent Office 3,031,764
Patented May 1, 1962

3,031,764
RANGE FINDER FOR GOLFERS
Edward A. Larson, 13856 Roscoe Blvd., Van Nuys, Calif.
Filed Nov. 17, 1958, Ser. No. 774,186
2 Claims. (Cl. 33—64)

This invention relates to an improved range finder for golfers and has for one of its principal objects the provision of a device of the class described, which will enable a golfer to determine quite accurately the distance between his ball and the playing green, thereby enabling him to select the proper club.

One of the principal objects of this invention is to provide a small yet quite accurate and easily carried and handled range finder, thereby enabling better approach shots and consequently lower and more desirable scores.

Another important object of the invention relates to the provision of a distance indicator which is simple of construction, readily operated and not at all likely to get out of order.

Another and still further important object of the invention is to provide a range finder for golfers and possibly also other persons, which is based on the trigonometric principle of similar angles, and which is correspondingly calibrated for use in golfing and also for other purposes.

Other and further important objects of the invention will be apparent from the disclosures in the accompanying drawings and following specification.

The invention, in a preferred form, is illustrated in the drawings and hereinafter more fully described.

In the drawings:

FIGURE 1 is a top plan view of the improved range finder of this invention, showing particularly the calibrated dial for operating the same.

FIGURE 2 is a front view of the device, as illustrated in FIGURE 1.

FIGURE 3 is a rear view of the same.

FIGURE 4 is an enlarged view of the range finger with one-half of the body, or what might be termed the cover, removed. This view is taken on the plane of the line 4—4 of FIGURE 3, looking downwardly.

FIGURE 5 is an enlarged section, taken on the plane of the line 5—5 of FIGURE 1, looking in the direction indicated by the arrows.

FIGURE 6 is a detail sectional view on the broken line 6—6 of FIGURE 4, looking in the direction indicated, and showing the measuring or gauging portion of the apparatus in one extreme position.

FIGURE 7 is a view similar to FIGURE 6, but showing the measuring element in its other extreme position.

FIGURE 8 is a detail view of the measuring or gauging device, removed from the case and illustrating further details.

FIGURE 9 is a diagrammatic illustration of the manner of use of the golfer's range finder of this invention.

As shown in the drawings:

The reference numerals 10 and 12 indicate generally the two portions or halves of the case of the improved range finder of this invention. For purposes of distinguishing between the two, the element 10 will be hereinafter referred to as the cover, and the portion 12 as the bottom of the case.

It will be noted that these are very similar in shape and are adapted to be fitted and fastened together by screws or the like 14.

The material of the case may be of almost any material, such as a molded plastic, stamped or die-cast metal, or even of wood, and the interior is hollowed out, as best shown at 16 in FIGURES 4 and 5.

The shape, size and dimensions of the case can also be varied to meet requirements or particular environments, but if the apparatus is to be used by golfers, it is essential that it be of relatively light weight and also of a size to be readily carried, either in the user's pocket or in or attached to a golf bag.

As best shown in FIGURE 2, the front or forward end of the device is provided with a slot, the two halves of which are formed in the juxtaposed portions of the cover and bottom, respectively, as indicated at 18.

The rear or eye-piece end of the case is also provided with a slot 20, which is much narrower than the slot 18, as best shown in FIGURE 3, and also comprises two cut-away juxtaposed portions of the top and bottom elements. This end of the range finder is somewhat concave, as shown at 22 in the figures, thereby providing a more practical use and application of the golfer's eye thereto.

Recesses 24 and 26 are formed in the conjoined portions of the cover and bottom, adjacent the front end of the case, as best shown in FIGURE 4, and these recesses are adapted to receive the mechanism which determines the angle of vision through the device, and this procedure is best shown in FIGURE 9, which illustrates the case at 10, a user's eye at 30 and three flag poles, such as those ordinarily employed in golf courses, at 32, 34 and 36.

From an inspection of FIGURES 6, 7 and 8, it will be noted that the angle determining mechanism consists essentially of a pair of strips 40 and 42 of metal or the like which extend across the aperture 18 and can be moved toward and from each other by rotation of a disc or the like 50, which is positioned in a recess 26 and mounted on a supporting pin 52. The ends of this pin 52 are positioned in suitable semi-cylindrical slots or notches adjacent the larger recess 26, whereby the calibrated disc 50 can be readily rotated by the user or operator in an obvious manner.

One end of each of the strips 40 and 42 is pivotally attached to the forward face of the disc 50 by pins 60 and 62, respectively, and the other ends of the pins are joined by a link 64 and connected thereto by pins 66 and 68, respectively.

A pin 70 positions the link 64 for simultaneous rotation with the disc 50, and this pin is fitted into corresponding semi-cylindrical grooves or slots 72 adjacent the recess 24.

Referring now again to FIGURES 6, 7 and 8, it will be obvious that rotation of the disc 50 in a clockwise direction, as viewed from FIGURE 6, will cause the links 40 and 42 to approach each other from their maximum spaced-apart distance, and this will lessen the gap which is visible to the eye of an observer at 20, looking toward and through the slot 18.

It will further be noted that the strip 40 is provided with an indentation 74 and the strip 42 is provided with a corresponding indentation 76, and a reference to FIGURE 7 will show that these indentations allow of a complete movement of the two strips 40 and 42 toward each other and to a point where the space between them is zero.

It will also be noted that the top or cover element 10 is so recessed as to provide a shoulder or stop 78 which limits the counter-clockwise movement of the disc 50 and the corresponding and related parts.

In operation, the case 10—12 is held in the hand of the observer or golfer, and his eye is applied to the aperture or slit 20, all as best shown in FIGURE 9.

He then aims the range finger at the particular flag pole on the golfing green which he is approaching, and it is a flnown fact that the tops of standard flag poles for golf courses, at least in this country, are eight feet above the surface of the green.

By using the method of similar triangles, the disc 50 can be calibrated, as at 80, and in conjunction with an indicating point 92 on the case 10, whereby a simple turning of the disc or dial 50 to the point where the bottom of the flag pole appears to be in alinement with the top edge of the strip 42, and the top of the flag pole is in alinement with the lower edge of the strip 40; a very accurate estimate of the distance to that particular flag pole is had.

If the calibrations 80 on the disc or dial 50 must, in some cases, necessarily be quite small, a simple series of numbers or letters can be used and in conjunction with a distance scale which can be either engraved in the case or applied thereto in some suitable manner.

It will be seen that herein is provided a range finder for golfers and others which is simple of operation, composed of a minimum number of parts, is not likely to get out of order and will always furnish a very accurate and reliable indication of the distance from one point to another, provided one known dimension is available.

For example, knowing the height of an ordinary automobile, the distance from the observed to said automobile can be readily calculated and determined, and the apparatus can be used in surveying and for like and similar purposes with little or no change.

It is of light weight, easily carried, immediately available for use and can be operated by anyone with practically no previous experience and from a very simple set of instructions.

I am aware that many changes may be made and numerous details of construction varied throughout a wide range without departing from the principles of this invention.

I claim as my invention:

1. A distance determining device comprising the combination of an elongated hollow case through which a distant object may be observed; said case having a narrow slit at the eye end and a wide opening at the object end; a longitudinal support member mounted in said case; a disc pivotally mounted on said support member; parallel strips extending transversely across said opening and each having one of its ends pivotally mounted on said disc; guide means transversely located in said case to receive the other ends of said strips; the movement of said disc resulting in the simultaneous movement of said strips toward and away from each other; said guide means being operative to guide said other ends so that the adjacent edges of said strips are continuously parallel during said simultaneous movement; the movement of said strips causing the effective area of said opening to vary; said disc being calibrated to automatically indicate the distance away of an object viewed through said slit and opening.

2. The distance determining device of claim 1 wherein said guide means comprises a pivoted linking member having its ends pivotally connected to said other ends of said strips.

References Cited in the file of this patent

UNITED STATES PATENTS

| | | |
|---|---|---|
| 53,420 | Daly | Mar. 27, 1866 |
| 613,566 | Farrand | Nov. 1, 1898 |
| 1,353,151 | Deming | Sept. 21, 1920 |
| 1,826,582 | Szabo | Oct. 6, 1931 |
| 2,734,273 | Blindenbacher et al. | Feb. 14, 1956 |
| 2,814,879 | McKnight | Dec. 3, 1957 |